United States Patent [19]
Wyatt

[11] Patent Number: 5,944,447
[45] Date of Patent: Aug. 31, 1999

[54] UNDERWATER PIPELINE ENTRENCHING APPARATUS AND METHOD OF USING THE SAME

[76] Inventor: Donald R. Wyatt, 392 Cemetery Loop, Winnsboro, La. 71295

[21] Appl. No.: 09/186,805

[22] Filed: Nov. 5, 1998

[51] Int. Cl.⁶ ........................................................ F16L 1/12
[52] U.S. Cl. ............................................. 405/163; 37/323
[58] Field of Search ...................................... 405/159, 160, 405/161, 162, 163, 164; 37/323, 322, 321, 342, 344

[56] References Cited

U.S. PATENT DOCUMENTS

| | | | |
|---|---|---|---|
| 3,576,111 | 4/1971 | Henry, Jr. ................................. | 405/163 |
| 3,751,927 | 8/1973 | Perot, Jr. ................................. | 405/163 |
| 4,114,390 | 9/1978 | Steveninck et al. ..................... | 405/163 |
| 4,389,139 | 6/1983 | Norman . | |
| 4,586,850 | 5/1986 | Norman et al. .......................... | 405/163 |
| 4,992,000 | 2/1991 | Doleshal . | |
| 5,288,172 | 2/1994 | Reuhl . | |
| 5,659,983 | 8/1997 | Coutarel et al. . | |

*Primary Examiner*—Tamara Graysay
*Assistant Examiner*—Sunil Singh
*Attorney, Agent, or Firm*—William W. Stagg

[57] ABSTRACT

A system for entrenching an underwater pipeline on a water bottom. The system is comprised of an underwater pipeline positioned on a water bottom; a floating vessel; an elongated tubular entrenching tool having a plurality of tool nozzles; a jetting head having a plurality of nozzles attached to the entrenching tool by a flexible jetting head hose; first and second waterlines; means for connecting the first waterline to the rear end of the entrenching tool and means for connecting the second waterline to the front end of said tool; and means for suspending the entrenching tool below the pipeline. A pump supported on the surface vessel is connected to the waterlines and is utilized to pump a volume of water at a desired pressure through the waterlines to the entrenching tool to create a trench on the water bottom for entrenching the pipeline by the jets of water at the tool and jetting head nozzles. The entrenching tool also has an attached air pipe connected to an air hose and an air compressing means supported on the surface vessel to produce a volume of air at a desired pressure through air holes in the air pipe to enhance the creation of the trench and the entrenchment of the pipeline. The systems is provided with means to move the suspended entrenching tool along the pipeline to further expand the trench created by the tool.

20 Claims, 3 Drawing Sheets

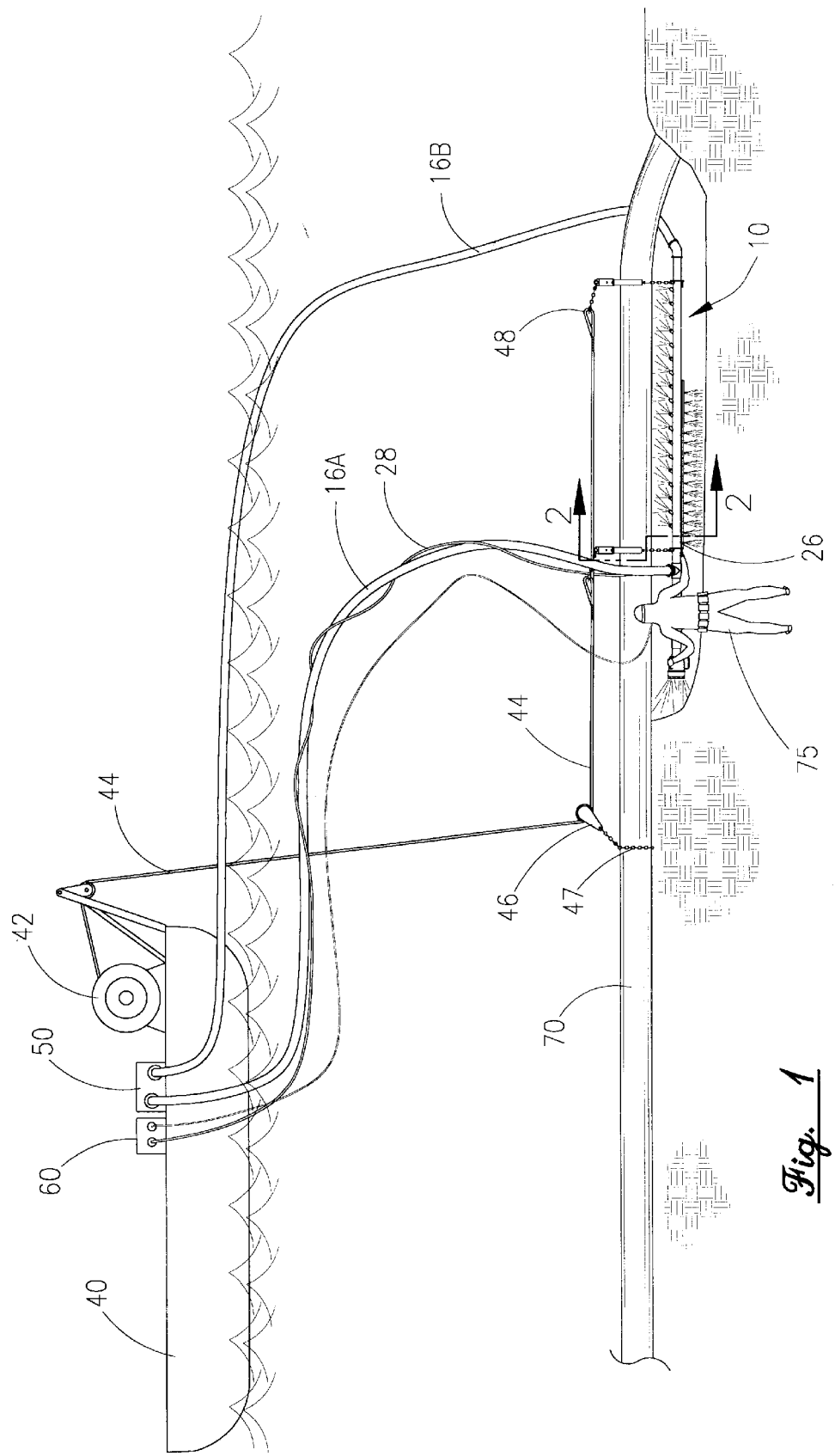

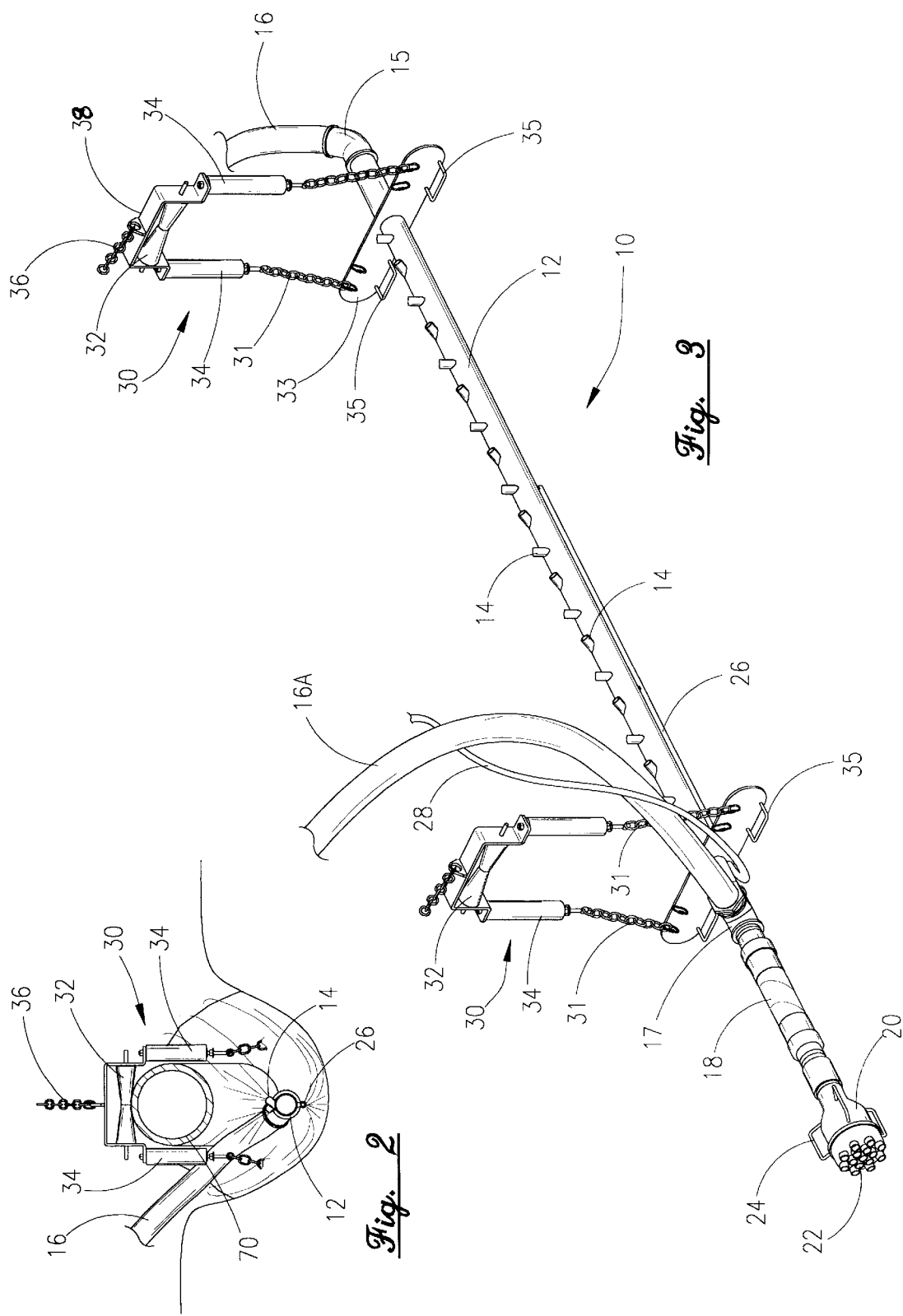

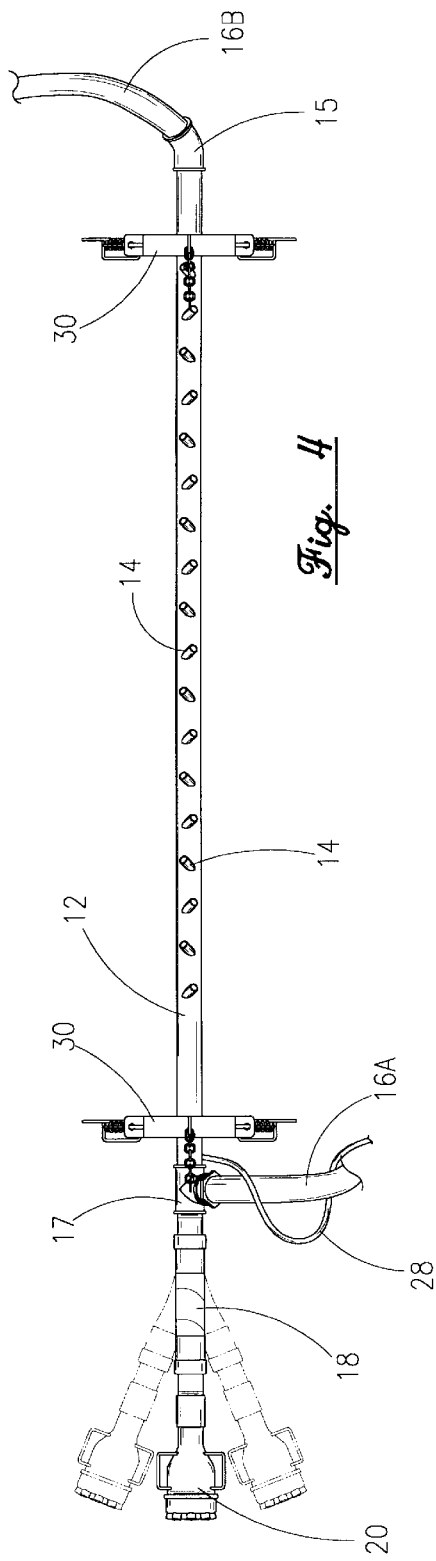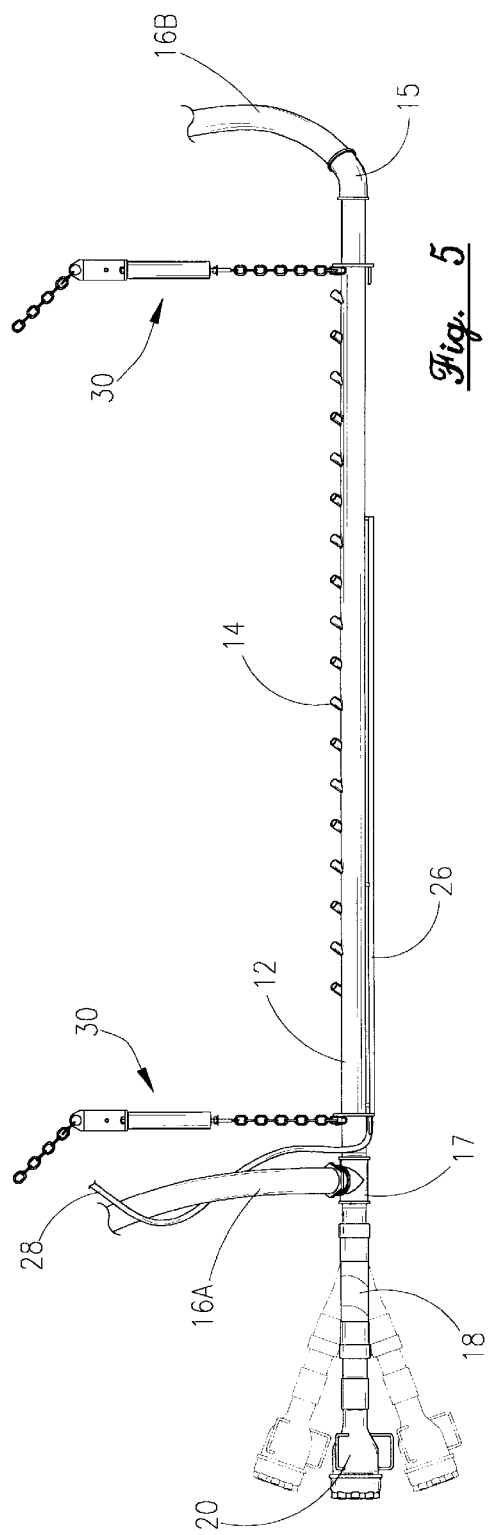

UNDERWATER PIPELINE ENTRENCHING APPARATUS AND METHOD OF USING THE SAME

FIELD OF INVENTION

The present invention generally relates to the field of underwater pipeline installation and more particularly relates to an apparatus for laying and burying a pipeline on a water bottom.

BACKGROUND OF INVENTION

In the field of pipeline construction, particularly in the production of oil and gas, it is often necessary to construct and install a pipeline on the bottom of a body of water such as a sea bed, lake bed or ocean floor. Typically these pipelines are buried in a trench cut into the water bottom. Divers are typically employed to use various tools and devices to create a trench on the water bottom to bury the pipe line.

Efforts have been made to provide tools to assist divers in burying a pipeline and to facilitate the formation of the trench and burying the pipeline. One such device is that described in U.S. Pat. No. 5,288,172 to Reuhl. The Reuhl device incorporates two opposing water jet legs carried on a hydraulically powered carriage forward of venturi tubes. Within the water jet legs are a plurality of nozzles mounted in a rotating tube to deliver jets of water in different angular directions upon the water bottom to loosen sediment for removal through the venturi tubes. The disadvantages of this device are its size and its complicated mechanical system which requires frequent maintenance.

Another underwater pipeline trench-filling device is that described in U.S. Pat. No. 5,659,983 to Coutarel, et al. This device incorporates nozzles mounted on a pair of arms. In operation, the arms straddle the pipeline and trench to allow the nozzles to direct jets of water onto the sea bed adjacent to the trench to move loosened soil into the trench to cover the pipeline. The disadvantages of this device are that it must be used in conjunction with a trenching device and must be housed on some conveying means to move the opposing arms along the pipeline.

Another device for burying pipeline has been described and illustrated in U.S. Pat. No. 4,992,000 to Doleshal. This patent discloses an underwater trenching system that provides a trenching sled having high pressure water jets for digging and a vacuum head and lines for sucking the resulting sediment into a surge tank on a barge, from which it is re-deposited by a bury sled. A disadvantage of this device is that the device is large and difficult to use and incorporates high pressure vacuum pumps which are subject to frequent maintenance and unwieldy vacuum lines which may be difficult to manipulate.

Another device used to entrench and bury underwater pipeline is that disclosed in U.S. Pat. No. 4,389,139 to Norman. The Norman patent discloses a self-propelled apparatus having oscillating water jet nozzles used to cut away the water bottom formation to form a trench. The nozzles are positioned within the trench it creates as the device moves along the pipeline. One disadvantage of this device is that it is large and bulky making it difficult to manipulate underwater. Another disadvantage is that its many components make it subject to frequent maintenance and repair.

Consequently, a need exist for an improved apparatus to bury underwater pipelines that is simple to operate, easily to manipulate underwater, and that has minimal maintenance requirements.

SUMMARY OF INVENTION

The present invention provides an underwater pipeline entrenching apparatus and system designed to satisfy the aforementioned needs. Applicant's apparatus has a minimum of movable parts, is light, and is easily manipulated underwater by divers. The apparatus is comprised of a tubular barrel having a plurality of upwardly and outwardly directed jetting nozzles. At one end of the tubular barrel is a jetting head having a plurality of nozzles attached to the tubular barrel by means of a flexible hose. Fittings at the other end of the barrel and the jetting head allow for attachment to water supply lines connected to a water pump located on a surface vessel.

In operation the tubular barrel is suspended from the pipeline to be buried by a harness or other suspending means. Water is pumped through the water supply lines to the tubular barrel and the jetting head by means of the water pump and through the jetting head nozzles and barrel nozzles. The jetting action creates a disturbance of the sediment on the water bottom that allows for the sinking and burying of the pipeline.

In the preferred embodiment, the apparatus is pulled along the pipeline by divers. Handles are attached to the jetting head to facilitate moving the apparatus along the pipeline and for assisting a diver in turning the jetting head to direct the jetting flow in a desired direction. The apparatus is configured to allow manipulation by a single diver. An air pipe having a plurality of air holes is position along the bottom of the tubular barrel and connected to an air line and pump on the surface vessel. Compressed air flow through the air holes serves to lift the water bottom sediment facilitating entrenchment of the pipeline.

Therefore, it is an object of the invention to provide an easily manipulated entrenching tool to aid divers in the burial of underwater pipelines and cables. It is another object of the invention to provide an entrenching apparatus that requires a minimum of maintenance. It is still and object of the invention to provide an underwater entrenching apparatus with a minimum of moving parts. Other objects of the invention will be apparent from the disclosure made herein.

BRIEF DESCRIPTION OF THE DRAWINGS

FIG. 1 is a side elevation view of an underwater entrenching apparatus and system in accordance with the present invention.

FIG. 2 is a cross-sectional view from FIG. 1 of the entrenching apparatus.

FIG. 3 is a FIG. 3 is a perspective view of the entrenching apparatus of the present invention.

FIG. 4 is top view of the entrenching apparatus of the present invention.

FIG. 5 is a side elevation view of the entrenching apparatus of the present invention.

DESCRIPTION OF PREFERRED EMBODIMENT

Referring now to the drawings and more particularly to FIG. 1 and FIG. 2, there is shown the preferred embodiment of applicants' pipeline entrenching system 10. This system 10 is comprised of a tubular entrenching tool 12 utilized, as can be seen, for creating a trench for burying a pipeline 70 upon the floor of a body of water such as an ocean, lake or the like.

The system 10 is comprised of a boat or other surface vessel 40 utilized to provide support to the entrenching tool 12 for entrenchment of a pipeline 70.

Waterlines 16A and 16B extend from a water pump 50 supported on the vessel 40 to the entrenching tool 12 to supply a desired water supply to the tool 12. Similarly, the entrenching tool 12 is supplied with a flow of compressed air from a compressed air hose 28 connected to an air compressor 60 on the support vessel 40. For the preferred embodiment to the tool 12 and system 10 described herein, it is thought that a three-stage water pump capable of operating at a pressure of 300 psi would be sufficient to provide adequate water flow as would a compressor supplying compressed air at a rate of 700 ft/min.

As shown in FIG. 3, the tool 12 is comprised of a tubular pipe member, this member having an upper surface upon which are a plurality of water nozzles 14. The nozzles 14 are arranged so as to be spaced evenly apart along the upper surface of the tool 12 and positioned to alternately extend at an angle upward and outward from the upper surface of the tool 12 in opposite directions. In the preferred embodiment of the tool 12, it is thought that a tubular pipe member having a diameter in the range of 2½ inches to 3½ inches and a length of approximately twelve feet and having approximately twenty angularity dispersed nozzles 14 would be sufficient for most trenching situations. For a tool 12 of such length, the preferred arrangement of the nozzles 14 is along the top center of the tool 12 with those nozzles being spaced six inches apart and positioned to alternately extend outward on either side of the tool 12. Preferably the nozzles are angled 45 degrees out and 30 degrees up from the centerline of the tool and 30 degrees up.

The rear of the tool 12 has a fitting 15 for attachment of the waterline 16B from the water pump 50. At the forward end of the tool 12 there is shown a "T" connection 17 for attachment of the second waterline 16A. The "T" connection 17 also allows for the attachment of a length of flexible jetting hose 18 to which is connected a jetting head 20 having a plurality of jetting head nozzles 22. Handles 24 are attached to jetting head 20 to facilitate moving the head 20 by flexing the jetting hose 18 back and forth to place the Jetting head nozzles in a desired direction.

FIG. 4 and FIG. 5 show the entrenching tool 12 in top view and side view, respectively. As can be seen the flexible jetting hose 18 allows the jetting head to be positioned from side to side and upwards and downwards in a desired direction in order to scour the seabed to create a trench for the pipeline 70.

In the preferred embodiment described herein it is thought that waterlines 16B and 16A having a diameter of at least 2½ inches and a flexible jetting hose 18 having a diameter of at least 3 inches and a length of a least two feet would be adequate in most entrenching situations. It is also thought that in its preferred embodiment the jetting head 20 would be comprised of a swedge fitting capped at one end, the fitting varying in diameter from 3 inches at its open end to 6 inches at its capped end, with the plurality of jetting nozzles 22 extending outward from the capped end.

As illustrated an air pipe 26, extending substantially the length of the tool, is attached to the bottom of the tool 12. The air pipe 26 is closed at its forward end and its rearward open end is connected to the air hose 28 that extends to the air compressor 60 on the surface vessel 40. The air pipe 26 has a plurality of air holes 27 positioned spacedly apart along its bottom to allow compressed air from the compressor 60 to be jetted through the air holes 27 during the entrenching process. This jetting of compressed air serves to loosen the water bottom for creating the trench as well as to slow the re-settlement of the seabed around pipeline 70 during its entrenching.

The tool 12 is supported at selected points on and below the pipeline 70 by means of a cradle assembly 30 at the front and the rear of the tool 12. Each cradle assembly 30, as shown in the figures, has an inverted U-shaped roller assembly 38 that fits over the pipeline 70. Each roller assembly 38 is comprised of an upper pipe roller 32 that rests on top of the pipeline 70 and side pipe rollers 34 that extend downward on either side of the pipeline 70. A length of chain 31 extends downward from each of the side rollers 34 of the roller assemblies 38 for detachable attachment to a saddle plate 33 fixed to the tool 12. These chains 31 and roller assemblies 38 serve to support the tool 12 below the pipeline and allow the tool 12 to be pulled along the pipeline 70 as the trenching process proceeds. In the preferred embodiment, the saddle plate 33 has handle 35 as shown to facilitate handling and moving the tool 12.

The process of creating a trench and burying a pipeline using the entrenching system 10 is illustrated in FIGS. 1 and 2. As shown, the air hose 28 and water lines 16B and 16A are connected to the tool 12 at predetermined locations. The tool 12 is then lowered to the sea floor by hand or by a small wench and crane 42 and line 44. Divers 75 are in place to position the tool 12 in the desired location adjacent to the pipeline 70.

Once the tool 12 is in the desired position a flow of water from the water pump 50 through waterlines 16B and 16A to the tool 12 is gradually increased to a desired working pressure. This flow of water to the tool 12 creates pressured water jets at the nozzles 14 of the tool 12 and at the nozzles 22 of the jetting head 20. In the preferred embodiment a typical water pressure pump is in the range of 300 psi. After the desired water pressure is achieved the air compressor 60 is operated to provide air pressure at a desired volume of air flow through the air pipe 26. In the preferred embodiment a compressor producing at about 50 psi over the water bottom pressure is thought to be sufficient.

Once the air and water pressure are at desired levels, the divers 75 can then create an initial trench on the water bottom around and along a portion of the pipeline 70 by means of the jets of water streaming from the nozzles 14 and 22 on the tool 12 and the jetting head 20. The initial trench should be of a size sufficient to allow suspension of the tool 12 below the pipeline by means of the cradle assembles 30. Once the initial trench is in place, the cradle assemblies 30 are positioned over the pipeline 70. The chains 31 are then connected to each saddle 33 so as to allow the tool 12 to hang in the created trench below the pipeline 70.

Forward of the direction of work, a chain 47 is secure around the pipeline 70 to secure a snatch block 46. The cable 44 from the wench and crane 42 is then passed through the snatch block 46 and connected to the cradle assemblies 30 by padeyes 48. This cable and chain arrangement and the weight of the pipeline 70 serves to hold the cradle assemblies 30 in place over the pipeline 70. The pull on the cable 44 also assists the movement of the tool 12 along the pipeline.

As the entrenching operation proceeds, the entrenching tool 12 is pulled along the pipeline 70 by a diver or divers 75 who are assisted by means of the boat 40 and wench and crane 42. The jets of water from the tool nozzles 14 directed upward and to the side serve to lift the water bottom sediment and erode the water bottom to create a trench for the pipeline as the tool 12 is pulled along the pipeline 70. Difficult sections of water bottom are eroded by water jets from the nozzles 22 of the jetting head 20. If necessary the divers 75 can direct the jetting head 20 in a desired direction to widen or deepen the trench as desired. The air flow from the air pipe serves to lift the sediment from the trench being created and deposit it around the pipeline in the trench to effectuate the burial of the line. In this manner the trench is created and the pipeline 70 is buried as the tool 12 is moved along. The divers may speed up or slow down the movement of the tool 12 along the pipeline 70 as a given situation dictates.

It is thought that the pipeline entrenching system and method of the present invention and many of its attendant advantages will be understood from the foregoing description. It is also thought that it will be apparent that various changes may be make in the form, construction and arrangement of the parts of the present without departing from the spirit and scope of the invention or sacrificing all of its material advantages, the form described herein being merely a preferred or exemplary embodiment of the present invention.

PARTS LIST 10-entrenching assembly
12-tubular entrenching tool
14-tool nozzles
16B-first water hose
16A-second water hose
18-jetting head hose
20-jetting head
24-jetting head nozzles
26-air pipe
27-air holes
28-air hose
30-cradle assembly
31-chain
32-upper pipe roller
33-pipeline saddle
34-side pipe rollers
35-saddle handles
36-padeye chain
38-roller assembly
40-boat
44-cable
46-snatch block
47-snatch block chain
48-padeye
50-water pump
60-air compressor
70-pipeline
75-diver

I claim:

1. A system for entrenching an underwater pipeline on a water bottom comprising:
   (a) a floating vessel;
   (b) an elongated tubular entrenching tool having an upper surface and a lower surface and front and rear ends, said entrenching tool having a plurality of tool nozzles on said upper surface of said tool;
   (c) a jetting head, said jetting head having a plurality of nozzles and a means for attaching a hose to said jetting head;
   (d) a flexible jetting head hose having first and second ends, said first end of said flexible jetting head hose mounted to said front end of said tool, said second end of said flexible jetting head hose being attached to said hose attaching means of said jetting head;
   (e) first and second waterlines;
   (f) means for connecting said first waterline to said rear end of said tool and said second waterline to said front end of said tool;
   (g) an underwater pipeline positioned on a water bottom;
   (h) means for suspending said tool below said pipeline; and
   (i) pumping means supported on said vessel for pumping a volume of water at a desired pressure through said waterlines and through said tool and thereby forcing said volume of water through said tool nozzles and said nozzles of said jetting head so as create a trench on said water bottom for entrenching said pipeline by jets of water created at said tool nozzles and jetting head nozzles.

2. The system for entrenching an underwater pipeline on a water bottom as recited in claim 1, further comprising:
   (a) an air pipe having upper and lower surfaces, a closed front end and an open rear end, and a plurality of air holes positioned along said lower surface of said air pipe, said upper surface of said air pipe being attached to said bottom of said entrenching tool;
   (b) air compressing means supported on said vessel;
   (c) an air hose; and
   (d) means for connecting said air hose to air compressing means and to said rear end of said air pipe for conveying compressed air from said air compressing means to said air pipe and said air holes so as to create a flow of air at a desired pressure below said tool.

3. The system for entrenching an underwater pipeline on a water bottom as recited in claim 2, further comprising means for moving said tool along and below said pipeline.

4. The system for entrenching an underwater pipeline on a water bottom as recited in claim 3 wherein, said means for moving said tool along and below said pipeline includes providing a wench supported on said vessel, said wench having a cable connected to said wench and said tool for pulling said tool when said wench is engaged.

5. The system for entrenching an underwater pipeline on a water bottom as recited in claim 3, further comprising means for flexing said flexible jetting head hose and thereby positioning said jetting head and said jetting head nozzles and thereby providing jets of water in a desired location.

6. An apparatus for entrenching an underwater pipeline on a water bottom below the surface of a body of water, said apparatus having a support vessel floating on said water body surface, said apparatus further comprising:
   (a) A water pump;
   (b) an elongated tubular tool, said tool having a top surface and a bottom surface and front and rear ends;
   (c) a plurality of tool nozzles extending outward from said top surface of said tool;
   (d) a jetting head, said jetting head having a plurality of outwardly extending nozzles;
   (e) a flexible jetting head hose, one end of said jetting head hose being mounted to said jetting head and the other end of said jetting head hose being mounted to said front end of said tool;
   (f) a first water hose, said first water hose having one end connected to said water pump and its other end connected to said rear end of said tool so as to allow a quantity of water to flow from said water pump through said first water hose into said tool and out of said tool nozzles to create jets of water at said tool nozzles upward and outward from said tool nozzles and thereby eroding said water bottom to create a trench;
   (g) a said second water hose, said second water hose having one end connected to said water pump and its other end connected to said front end of said tool so as to allow a quantity of water to flow from said water pump through said second water hose into said tool and into said jetting head and out said jetting head nozzles to create jets of water at said jetting head nozzles and thereby further eroding said water bottom to create said trench, and (h) means for suspending said tool from said pipeline.

7. The apparatus for entrenching an underwater pipeline as recited in claim 6, further comprising:

(a) an air compressor;

(b) an air pipe having top and bottom surfaces, a closed end and an open end, said air pipe extending along the length of said tool with said top surface of said air pipe being fixed to said bottom of said tool, said air pipe having a plurality of air holes spacedly placed along the length of said air pipe bottom surface; and (c) an air hose connected to said air compressor and said open end of said air pipe so as to allow a quantity of air to flow from said air compressor through said air hose to said air pipe and through said air holes of said air pipe and thereby enhancing said eroding of said water bottom.

8. The apparatus for entrenching an underwater pipeline as recited in claim 7 wherein, said means for suspending said tool below said pipeline includes:

(a) an inverted U-shaped frame having an upper base and two downwardly extending side legs, a plurality of rollers mounted to said frame, said frame being positioned over said pipeline so as to allow said rollers to rest on said pipeline with said side legs extending downward on either side of said pipeline;

(b) detachable side chains extending downwardly from each of said side legs of said frame; and (c) means for attaching said side chains to said tool so as to allow said tool to hang below said pipeline from said frame.

9. The apparatus for entrenching an underwater pipeline as recited in claim 8, further comprising means for moving said tool along said pipeline.

10. The apparatus for entrenching an underwater pipeline as recited in claim 9, further comprising means for flexing said jetting head hose to allow positioning of said jetting head nozzles in a desired location.

11. The apparatus for entrenching an underwater pipeline as recited in claim 9, wherein means for moving said tool along said pipeline includes:

(a) a crane and wenching means supported on said vessel; and (b) a cable extending from said crane and wenching means to said inverted U-shaped frame for pulling said frame along said pipeline.

12. The apparatus for entrenching an underwater pipeline as recited in claim 6, wherein said tool nozzles are angled upward and outward from said top surface of said tool.

13. A method of entrenching an underwater pipeline located on a water bottom below the surface of a body of water comprising the steps of:

(a) providing a surface vessel floating on said surface of said body of water, said vessel having and supporting a water pump;

(b) providing an elongated tubular tool, said tool having a top surface and a bottom surface and front and rear ends, a plurality of tool nozzles extending upward and outward from said top surface of said tool, and a jetting head having a plurality of outwardly extending nozzles, said jetting head being connected to said front end of said tool by a flexible jetting head hose;

(c) providing a means for connecting a first water hose to said rear end of said tool, and a means for connecting a second water hose to said front end of said tool;

(d) providing a first water hose with one end of said first water hose connected to said water pump and the other end of said first water hose connected to said rear end of said tool so as to allow a quantity of water to flow through said first water hose into said tool and out said tool nozzles and thereby creating a jetting action at said tool nozzles when said water pump is in operation;

(e) providing a second water hose with one end of said second water hose connected to said water pump and the other end of said second water hose connected to said front end of said tool so as to allow a quantity of water to flow through said second water hose into said tool, then through said flexible jetting head hose, and into said jetting head and out said jetting head nozzles and thereby creating a jetting action at said jetting head nozzles when said pump is in operation; and (f) providing means for lowering said tool from said surface vessel to said water bottom to a position adjacent to said pipeline;

(g) operating said water pump to create an initial trench on said water bottom below and along said pipeline of a size sufficient to accommodate said tool within said initial trench below said pipeline by said jetting action from said tool nozzles and said jetting head nozzles;

(h) providing means for suspending said tool from said pipeline;

(i) suspending said tool from said pipeline; and (j) providing means for moving said tool forward along said pipeline while water is being pumped through said tool nozzles and said jetting head nozzles so as to enlarge and extend said initial trench along said pipeline by said jetting action of said flow water from said tool nozzles and said jetting head nozzles and thereby entrenching said pipeline within said trench.

14. The method of entrenching an underwater pipeline on a water bottom below the surface of a body of water as recited in claim 13, comprising the additional steps of:

(a) providing an air pipe having top and bottom surfaces, a closed front end, and an open rear end, said top surface of said air pipe being fixed to said bottom of said tool with said rear end of said air pipe positioned toward said front end of said tool, said air pipe having a plurality of air holes extending downward along the length of said bottom surface of said air pipe; and (b) providing an air compressor located on said surface vessel;

(c) providing air hose to run between said air pipe and said air compressor;

(d) connecting said air hose to said air compressor and to said rear end of said air pipe for supplying a quantity of air through said air hose to said air pipe and through said air holes of said air pipe at a desired pressure when said air compressor is in operation; and (e) operating said air compressor at a desired pressure so as to create an air flow through said air holes and thereby enhancing the entrenchment of said pipeline.

15. In an apparatus for entrenching an underwater pipeline on a water bottom below the surface of a body of water, said apparatus having a vessel floating on said water body surface, an air compressor and a water pump, said apparatus further comprising:

(a) an elongated tubular tool, said tool having a top surface and a bottom surface and front and rear ends;

(b) a plurality of tool nozzles extending from said top surface of said tool;
(c) a jetting head having a plurality of nozzles, said jetting head being connected to said front end of said tool by a flexible jetting head hose;
(d) means for suspending said tool from said pipeline; and
(e) means for providing a desired quantity of water to said tool and to said jetting head to create waters jets from said tool nozzles and said jetting head nozzles for eroding said water bottom to create a trench.

16. The apparatus for entrenching an underwater pipeline as recited in claim 15, further comprising:
(a) an elongated air pipe mounted to said bottom of said tool, said air pipe having a plurality of air holes spacedly placed along its length; and
(b) means for supplying a quantity of compressed air from said air compressor to said air pipe and through said air holes and thereby enhancing said eroding of said water bottom.

17. The apparatus for entrenching an underwater pipeline as recited in claim 16, further comprising means for moving said tool along said pipeline.

18. The apparatus for entrenching an underwater pipeline as recited in claim 17, further comprising means for flexing said jetting head hose to allow positioning of said jetting head in a desired location.

19. The apparatus for entrenching an underwater pipeline as recited in claim 18, wherein said tool nozzles are angled upward and outward from said top surface of said tool.

20. The apparatus for entrenching an underwater pipeline as recited in claim 18, wherein said means for flexing said jetting head hose to allow positioning of said jetting head in a desired location includes a plurality of handles mounted to said jetting head.

* * * * *